March 27, 1962   J. K. LANCASTER ET AL   3,027,449
SURFACE HEATING OF METALS
Filed Oct. 22, 1959
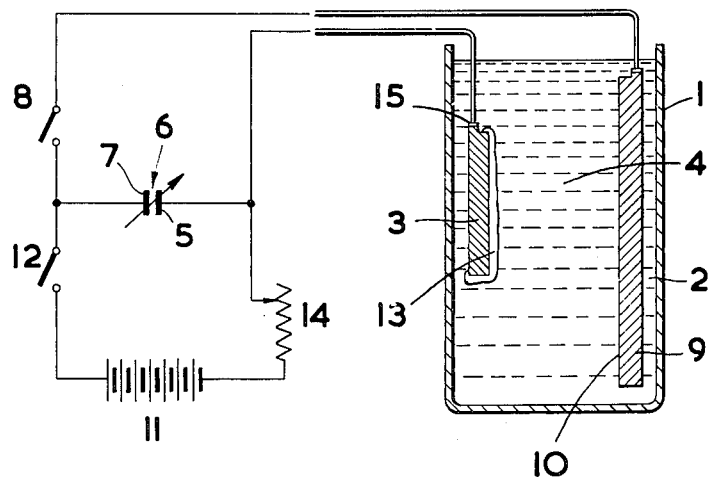
INVENTORS
JOHN KEITH LANCASTER
DAVID CONRAD MILNER
WALLACE HIRST
ATTORNEY – 3,027,449
Patented Mar. 27, 1962

3,027,449
SURFACE HEATING OF METALS
John Keith Lancaster, Tilehurst, Reading, David Conrad Milner, Reading, and Wallace Hirst, Tadley, England, assignors to The British Thomson-Houston Company Limited, London, England, a British company
Filed Oct. 22, 1959, Ser. No. 848,035
Claims priority, application Great Britain Oct. 24, 1958
3 Claims. (Cl. 219—121)

This invention relates to the surface heating of metals.

Many applications exist in which it is required to heat treat all, or part of, the surface of a metal object whilst preventing appreciable heat penetration into the body of the metal. Heat penetration might, for example, nullify a previous heat treatment or cause internal stresses and distortion. There are two general methods at present available for surface heating. In the first, the depth of penetration of heat is controlled by the speed of movement of the part to be heated relative to heat source, but this technique has the disadvantage that it is necessary to scan the surface to be heated and the mechanical arrangements required to do this will vary with the shape of the object. In the second method induction heating is employed and the depth of heating is controlled by varying the frequency of a radio-frequency power supply. This second method suffers from the disadvantage that the design of the necessary heating coil is complex and varies with the shape of the object being heated.

An object of the present invention is to provide a method which overcomes the above disadvantages and can be used for the surface heating of metal objects of a wide range of size and shape.

It is known that when a metal object is made the cathode in an electrolytic bath containing an aqueous solution of a suitable salt, for example a 10% sodium carbonate solution, and a sufficiently high voltage is applied to the anode, a high current discharge will occur across a thin gas or vapour envelope which forms around the cathode. To utilise this method for surface heating, it is necessary to maintain the discharge for times of the order of a few tenths of a second or less.

According to the invention, this is achieved by discharging a charged capacitor between the anode and cathode in the electrolyte.

Various ways of carrying the invention into effect will now be described with reference to the accompanying drawing which shows one form of apparatus which can be used.

Referring to the drawing, a bath 1 contains an electrolyte 2 formed by an aqueous solution of a suitable salt, for example a 10% sodium carbonate solution. A metal object 3, having a surface 4 which is to be heat treated, is submerged in the electrolyte 2 and connected by means of a terminal 15 to one plate 5 of a variable capacitor 6. The other plate 7 of the capacitor 6 is connected by way of a switch 8 to an electrode 9 which is also submerged in the electrolyte 2 with a surface 10 adjacent to and facing the surface 4 of the object 3. The plate 5 of the capacitor 6 is connected by way of a variable resistor 14 to the negative pole of a direct current source 11 the positive pole of which is connected to the plate 7 by way of a switch 12. With switch 8 open, switch 12 is closed for sufficient time to charge capacitor 7 to a high voltage dependent on the value of resistor 14, after which time switch 12 is opened. The switch 8 is then closed to connect the positively charged plate 7 to the electrode 9, so that the object 3 becomes a cathode electrode and electrode 9 becomes an anode electrode. Provided that the voltage of the source 11 and the capacitance of the capactor 6 are sufficiently great, taking into account the matters considered hereinafter, the resultant discharging of the capacitor 6 between the anode and cathode electrodes produces a high current discharge across a thin gas or vapour envelope 13 which forms around the surface 4, causing said surface 4 to be heated.

It can be shown that, if the value of the capacitor 6 is sufficiently large so that the self inductance of the electrical connections is negligible in comparison, the maximum temperature attained at the surface 4 is proportional to the product of the square root of the capacitance and the square of the voltage to which the capacitor 6 was originally charged. This maximum temperature is attained in a time approximately equal to one-quarter of the time constant of the electrical circuit through which the capacitor 6 discharges. The maximum temperature reached by the surface 4 can therefore be conveniently varied by varying the voltage to which the capacitor 6 is charged by means of resistor 14. The main effect of varying the value of the capacitor 6 is to vary the depth of penetration of heat during the discharge. The relationship between capacitance and the depth of heating is complex, but very approximately it may be shown that, if the object 3 is of steel say, a capacitance of 100 µf. is sufficient to heat the metal a few thousandths of an inch below the surface 4 to more than half the temperature attained at the surface 4, whereas with a capacitance of 10,000 µf. the depth at which the metal is half the surface temperature is increased to about one tenth of an inch.

In order to heat the surface 4, it is necessary for a stable gas or vapour envelope 13 to develop around the surface 4 while the capacitor 6 is discharging. As the time required to form the envelope 13 increases with decreasing temperature of the electrolyte 2, it is advantageous to maintain the electrolyte 2 at as high a temperature (below its boiling point) as possible. Increasing the electrolyte temperature has the additional advantage that it decreases the maximum voltage required to produce the electrical discharge across the envelope 13.

If the time constant of the discharge circuit of the capacitor 6 is comparable with the time required to form the envelope 13, most of the energy stored in the charged capacitor 6 is dissipated in heating of the electrolyte 2. There is therefore a lower limiting value of capacitor 6 below which it is impossible to produce an electrical discharge, this value being about 100 µf. for an electrolyte 2 comprising a 10% aqueous solution of sodium carbonate at 97° C. In consequence there is a minimum thickness of metal below the surface 4 (in addition to a maximum thickness) which it is possible to heat using a capacitor 6 of a particular value. With increasing capacitance, the efficiency of conversion of the energy stored in the charged capacitor 5 to energy liberated in the electrical discharge increases until the capacitance is about ten times the lower limiting value; the efficiency may then be of the order of 90%.

In order to restrict heat penetration to very small depths of the order of one-thousandth of an inch, an auxiliary direct current source (not shown) may be employed in conjunction with the discharge of a capacitor 6 of relatively small value. The negative pole of the auxiliary direct current source is connected to the object 3 and the positive pole is connected to the electrode 9 so that the current flowing maintains a stable gas or vapour envelope 13. When the capacitor 6 is subsequently discharged as previously described, most of its stored energy is utilized in the electrical discharge and, as its capacitance is small the depth of heat penetration is small. For example, for surface hardening an object 3 of high carbon steel to a depth of one-thousandth of an inch, the auxiliary direct current source can be used to provide pre-heating of the surface of the object to a temperature of several hundred degrees centigrade by continuous electric discharge, following which a capacitor 6 of about 60 µf. is discharged between the object 3 and the electrode 9. The required maximum temperature produce at the surface 4 is obtained by adjustment of the charge on the capacitor 6. Using this combination of charged capacitor 6 and auxiliary direct current source it is possible to perform successive heat treatments, for example, hardening and tempering, during a single operation.

To obtain a given temperature at the surface 4, the voltage to which the capacitor 6 must be charged increases with the size of the surface 4 to be heated, and for large surfaces the voltage required may become excessively high. For example, to heat a surface area 10 cm.² on an object 3 of steel, to a temperature of 1,000° C. using a capacitor of 10,000 µf. requires a source of at least 4 kv. For large surfaces it is therefore preferable to restrict the area over which the electric discharge occurs by using an insulating shield in the manner described in our copending patent application Serial No. 847,922, filed October 22, 1959. Relative movement between the object 3 and the insulating shield may then be effected and a succession of energy pulses from the capacitor 6 applied until the whole of the surface 4 has been treated. When it is necessary to confine the heat penetration to a very small depth, this pulsed discharge method with restricted discharge area is superior to a continuous discharge method with area restriction.

What we claim is:

1. A process for heat treating a metal surface of an object comprising the steps of arranging said object to constitute one of two electrodes in an electrolytic bath containing as electrolyte an aqueous solution of suitable salt having at least said surface of the object submerged therein, subjecting the electrolyte and object surface to a pre-heating action, and thereafter discharging a charged capacitor between said electrodes with a polarity such that said object forms a cathode and the other electrode forms an anode, the magnitude of the charge being such as to cause the production of an electrical discharge across a gas or vapour envelope at said surface for only a brief time sufficient to effect the required surface heating without appreciable heat penetration below said surface.

2. A process for heat treating a metal surface of an object comprising the steps of arranging said object to constitute one of two electrodes in an electrolytic bath containing as electrolyte, an aqueous solution of suitable salt having at least said surface of the object submerged therein, heating the electrolyte to an elevated temperature below its boiling point, and thereafter discharging a charged capacitor between said electrodes with a polarity such that said object forms a cathode and the other electrode forms an anode, the magnitude of the charge being such as to cause the production of an electrical discharge across a gas or vapor envelope at said surface or only a brief time sufficient to effect the required surface heating without appreciable heat penetration below said surface.

3. A process for heat treating a metal surface of an object comprising the steps of arranging said object to constitute one of two electrodes in an electrolytic bath containing as electrolyte an aqueous solution of suitable salt having at least said surface of the object submerged therein, connecting between said electrodes to produce preheating with formation of a gas or vapour envelope at said surface, a direct current source having a polarity such that said object forms a cathode and the other electrode forms an anode, and thereafter discharging a charged capacitor between said electrodes with the same polarity as said source the magnitude of the charge being such as to cause the production of an electrical discharge across said envelope for only a brief time sufficient to effect the required surface heating without appreciable heat penetration below said surface.

References Cited in the file of this patent

UNITED STATES PATENTS

| 537,402 | Burton | Apr. 9, 1895 |
| 2,953,672 | Wisken | Sept. 20, 1960 |

FOREIGN PATENTS

| 781,710 | Great Britain | Aug. 21, 1957 |